(12) United States Patent
Downey et al.

(10) Patent No.: US 9,233,773 B2
(45) Date of Patent: Jan. 12, 2016

(54) REINFORCED INTERMODAL CONTAINER

(71) Applicant: newterra ltd., Brockville (CA)

(72) Inventors: Jason Downey, Ottawa (CA); Ardjan Muca, Toronto (CA)

(73) Assignee: Newterra Ltd., Brockville, Ontario (CA)

( * ) Notice: Subject to any disclaimer, the term of this patent is extended or adjusted under 35 U.S.C. 154(b) by 14 days.

(21) Appl. No.: 14/176,122

(22) Filed: Feb. 9, 2014

(65) Prior Publication Data

US 2014/0224791 A1    Aug. 14, 2014

Related U.S. Application Data

(60) Provisional application No. 61/762,968, filed on Feb. 11, 2013, provisional application No. 61/875,267, filed on Sep. 9, 2013.

(51) Int. Cl.

| | |
|---|---|
| *B65D 6/32* | (2006.01) |
| *B65D 88/12* | (2006.01) |
| *B65D 1/40* | (2006.01) |
| *B65D 90/08* | (2006.01) |
| *B65D 90/02* | (2006.01) |

(52) U.S. Cl.
CPC .. *B65D 1/40* (2013.01); *B65D 7/38* (2013.01); *B65D 90/022* (2013.01); *B65D 90/08* (2013.01); *B65D 88/121* (2013.01)

(58) Field of Classification Search
CPC ............ B65D 7/38; B65D 88/12; B65D 7/42; B65D 7/44; B65D 7/46; B65D 1/40; B65D 88/121; B65D 90/022; B65D 90/08

USPC .............. 220/1.5, 670, 646; 296/186.1, 182.1
See application file for complete search history.

(56) References Cited

U.S. PATENT DOCUMENTS

| | | | | |
|---|---|---|---|---|
| 2,038,064 | A | * | 4/1936 | Stetson .......................... 220/1.5 |
| 2,085,085 | A | * | 6/1937 | Dougherty ................. 220/567.2 |
| 6,286,707 | B1 | * | 9/2001 | Hall et al. .................. 220/567.2 |
| 7,288,192 | B2 | * | 10/2007 | Jowett ........................... 210/220 |

FOREIGN PATENT DOCUMENTS

CA          2418876 A1      4/2004

* cited by examiner

*Primary Examiner* — Fenn Mathew
*Assistant Examiner* — Don M Anderson
(74) *Attorney, Agent, or Firm* — Stuart L. Wilkinson

(57) ABSTRACT

A reinforced intermodal container has a corrugated steel wall with an outer side and an inner side. In a length direction the corrugations have alternating inboard and outboard flat panels with adjacent panels linked by web portions. A strengthening structure is welded to the container wall which provides flanges extending generally perpendicularly to the general plane of the wall. The flanges extend between plates welded to the inside faces of the outboard panels and flat strengthening plates welded to the inside faces of the inboard panels. The strengthening structure does not alter the outside width of the container in comparison with the outside width of the unreinforced container. The strengthening structure reduces the inside volume of the container by only a small amount compared with the volume of the unreinforced container.

10 Claims, 5 Drawing Sheets

REINFORCED INTERMODAL CONTAINER

CROSS REFERENCE TO RELATED PATENTS

The present application claims priority under 35 USC 119(e) to provisionally filed U.S. Application entitled "Container conversion for water treatment tank", having Ser. No. 61/762,968, and filed on Feb. 11, 2013, the contents of which are expressly incorporated herein in their entirety by reference thereto. The present application further claims priority under 35 USC 119(e) to provisionally filed U.S. Application entitled "Method of reinforcing an intermodal container and container so reinforced", having Ser. No. 61/875,267, and filed on Sep. 9, 2013, the contents of which are expressly incorporated herein in their entirety by reference thereto.

FIELD OF THE INVENTION

This invention relates to a method of converting shipping containers and converted containers obtained thereby, such converted containers having particular application in the wastewater treatment industry.

DESCRIPTION OF RELATED ART

Water tanks are needed for a variety of purposes in the context of wastewater treatment. Holding tanks are used for storing water before or after it is treated. Equalization tanks are used in processes for dampening large variations in water flow rate or quality. Aeration tanks are used for stimulating aerobic breakdown of contaminants in wastewater. Membrane bioreactor (MBR) tanks are used to remove contaminants during or after aeration. Settling tanks are used to remove heavier than water solids. Filtration tanks are used for filtering wastewater. Air/water tanks, in which countercurrents of air and water are flow over packing material, are used for air stripping of volatile contaminants or for cooling and evaporation.

There is a requirement for easily portable tanks that can be partly or fully pre-fabricated and shipped to deployment sites. The requirement for transporting in conventional intermodal container sizes places limitations on the length, footprint area and height of prefabricated mobile units. It has been proposed that an intermodal container itself be used in the manufacture of a water treatment tank. A typical intermodal container (also called shipping container, freight container, ISO container, hi-cube container, box, conex box and sea can) is a standardized reusable steel box used for the storage and movement of materials and products within a global containerized intermodal freight transport system. External lengths of containers, which each have a unique ISO 6346 reporting mark, vary from 8 feet (2.438 m) to 56 feet (17.07 m) with the most common lengths being 20 feet and 40 feet. Heights of containers compliant with ISO 6346 are from 8 feet (2.438 m) to 9 feet 6 inches (2.9 m). Widths are generally 8 feet.

It would be valuable to have a reinforced container conversion that alters the outside and inside dimensions of the container either not at all of by a minimal extend so that the container can continue to be used as a standard compliant container, notwithstanding the conversion.

BRIEF DESCRIPTION OF THE DRAWINGS

For simplicity and clarity of illustration, elements illustrated in the following figures are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
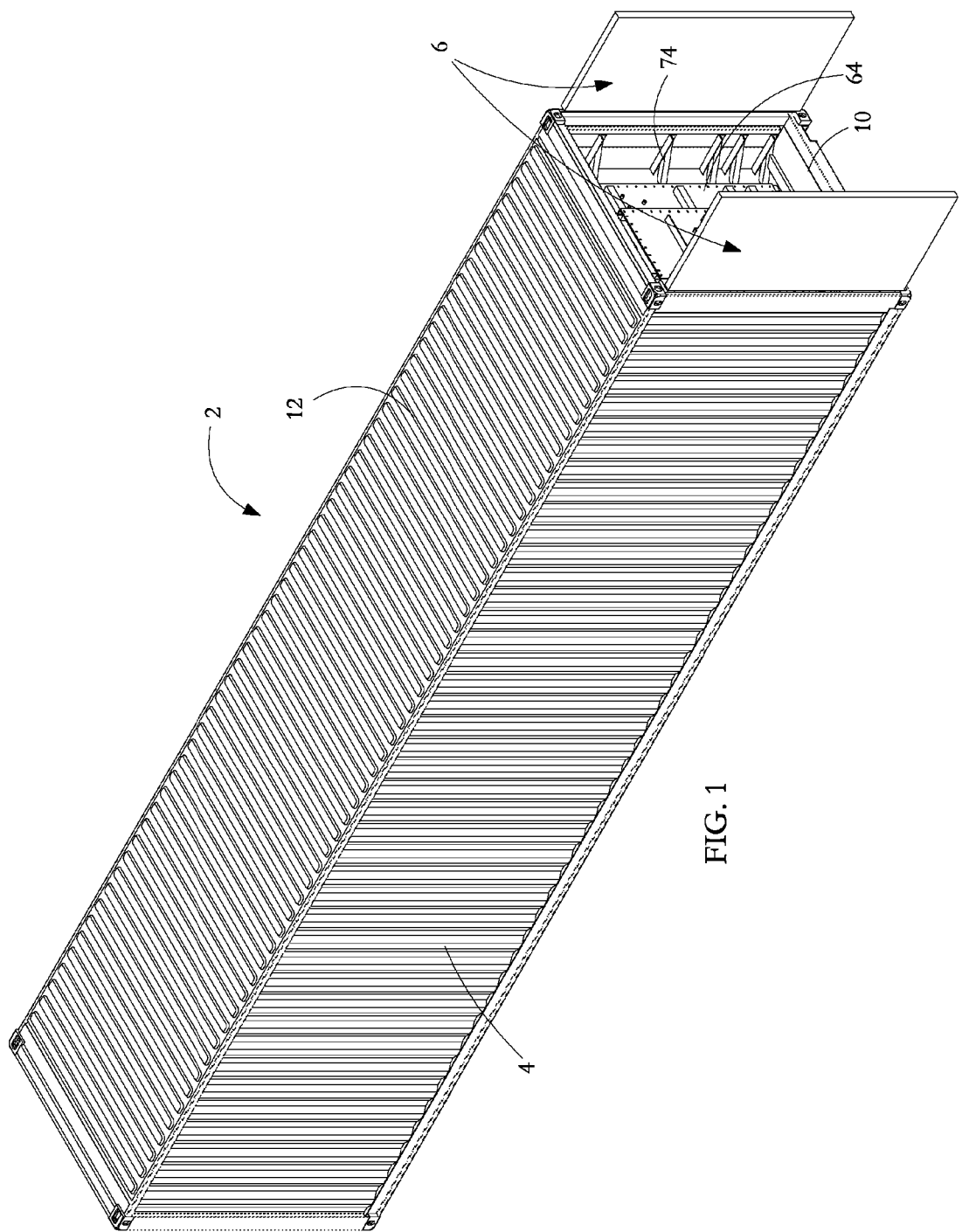
FIG. 1 is an isometric view from the front and one side of a converted intermodal container according to an embodiment of the invention.
Figure 2:
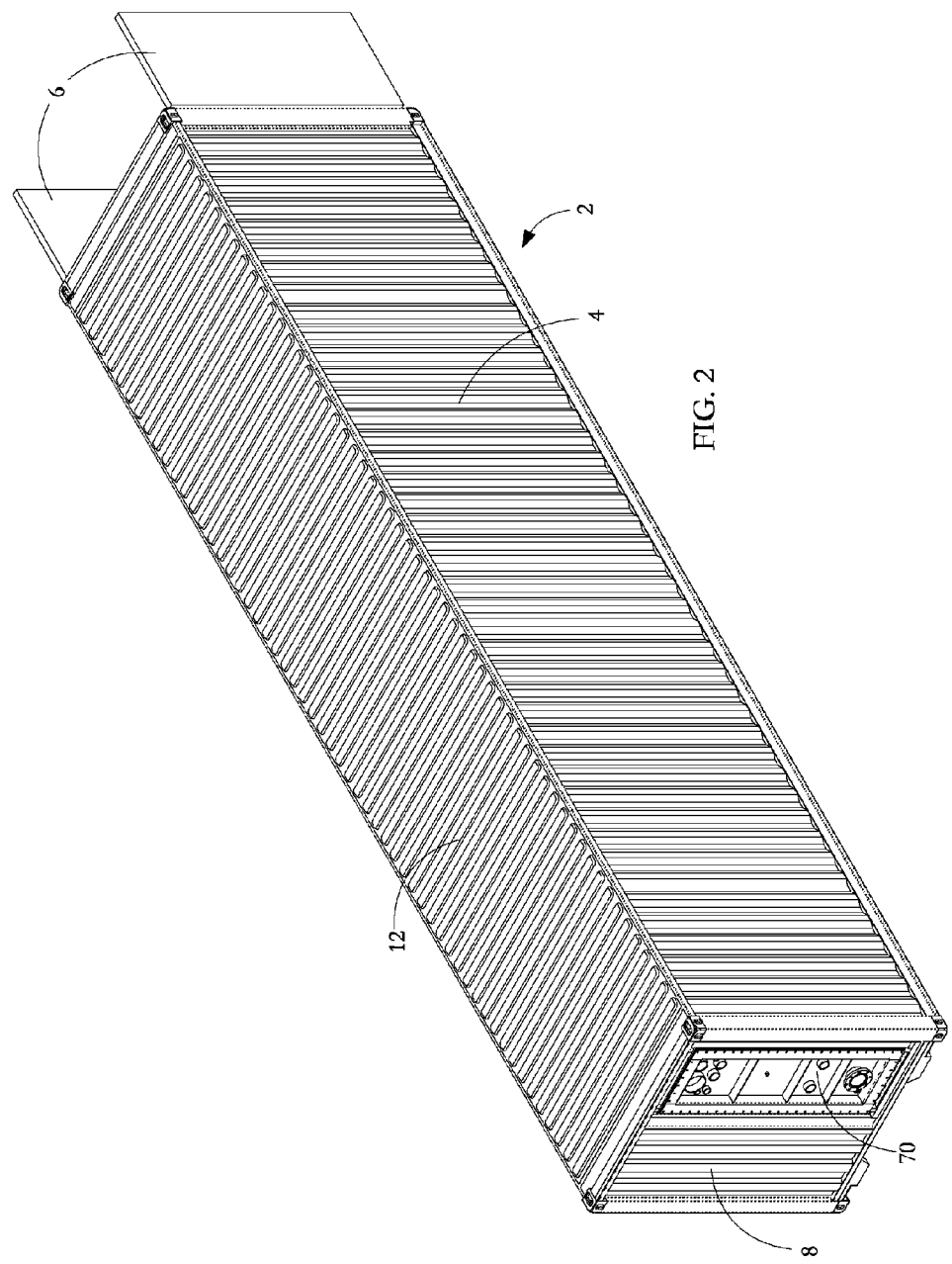
FIG. 2 is an isometric view from the rear and the other side of the converted intermodal container of FIG. 1.

As shown in the isometric illustrations of a reinforced intermodal container 2 in FIGS. 1 and 2, an intermodal container is basically a box made from weathering sheet steel having side walls 4, a front door wall 6, a rear wall 8, a floor 10 and a roof 12. Such containers are also known as shipping or freight containers and are conventionally used for the storage and movement of materials and products within a global containerized intermodal freight transport system. "Intermodal" indicates that the container can be moved from one mode of transport to another (e.g. from ship, to rail, to truck) without unloading and reloading the contents of the container.

Under ISO 6346 standard, the length of a container may be any of a range of external lengths each corresponding to an ISO 6346 reporting mark. Such lengths may vary from 8 feet (2.438 m) to 56 feet (17.07 m) with the most common lengths being 20 feet and 40 feet. Heights of containers compliant with ISO 6346 are from 8 feet (2.438 m) to 9 feet 6 inches (2.9 m). Widths are generally 8 feet.

Figure 3:
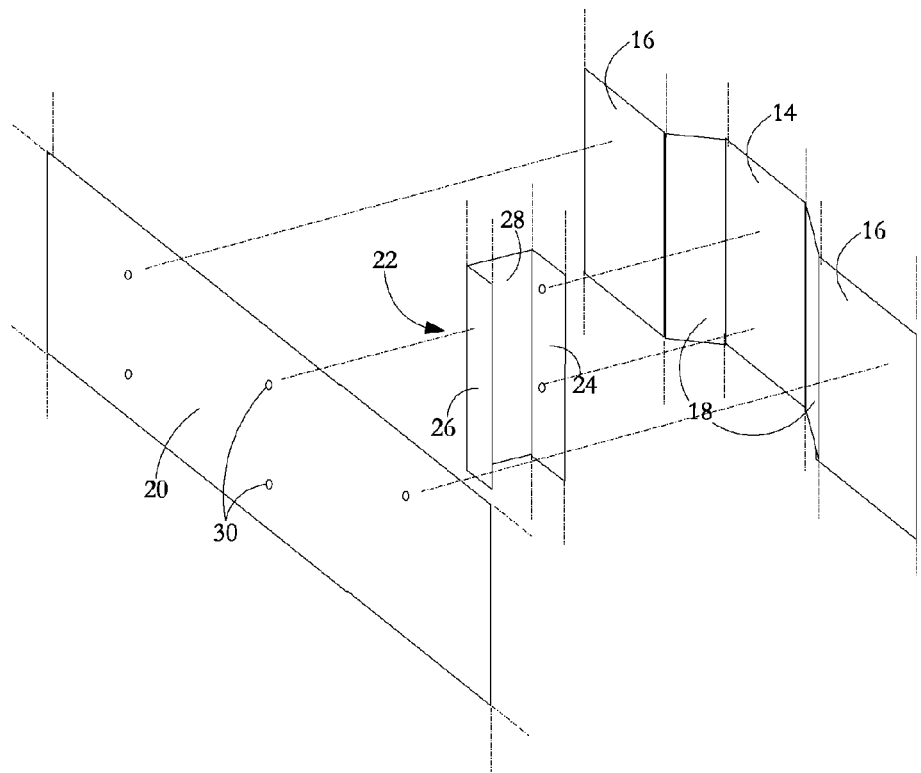
FIG. 3 is an exploded isometric view of part of a reinforcing arrangement according to an embodiment of the invention and used in a converted intermodal container.
Figure 4:
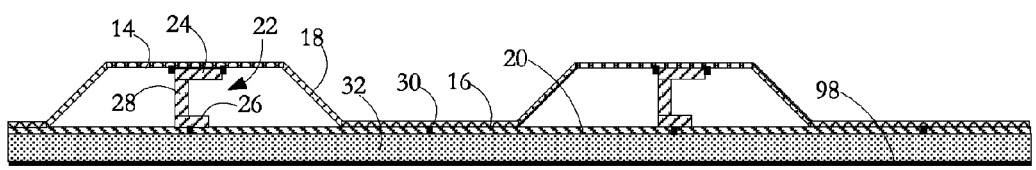
FIG. 4 is a horizontal sectional view of the reinforcing arrangement of FIG. 3.
Figure 5:
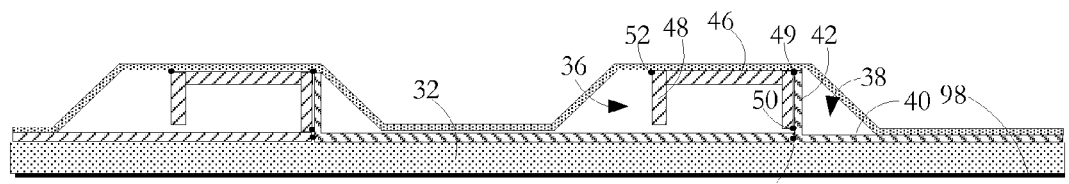
FIG. 5 is a horizontal sectional view of an alternative intermodal container reinforcing arrangement according to an embodiment of the invention.
Figure 6:
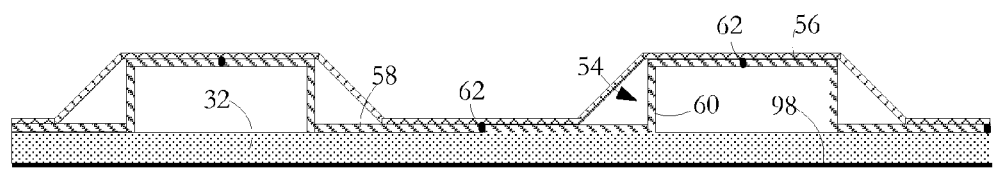
FIG. 6 is a horizontal sectional view of a further alternative intermodal container reinforcing arrangement according to an embodiment of the invention.

As shown in the detail isometric view of FIG. 3 and the detail sectional view of FIG. 4, container walls are made of corrugated painted weathering sheet steel having a thickness of the order of a sixteenth of an inch. The walls have in sequence along their length, alternating outboard and inboard panels, respectively 14 and 16, each outboard panel integrally joined to its adjacent inboard panels by sloping web portions. The panels extend from the bottom to the top of the intermodal container. While the corrugated wall formation provides some strength against lateral and vertical forces, if an unreinforced container is filled with water, the corrugation simply expands like an accordion. The walls are then incapable of offering resistance to the lateral forces imposed by the contained water and the container will consequently bow outwards and burst. FIGS. 5 and 6 show two alternative configurations for reinforcing a container wall so that the container may be used for processing water or other liquids.

Referring in detail to FIGS. 3 and 4, there is shown part of the wall of a reinforced intermodal container. The wall is reinforced by welding a reinforcing structure to the inside of the wall, the reinforcing structure including a sheet steel panel 20 having a thickness of the order of one eighth of an inch and channel form stiffeners 22 made of cold-formed steel plate of the order of three sixteenths of an inch in material thickness. The channel member 22 has walls 24, 26 bridged by flange 28. The channel members 22 are welded to each outboard panel 14 with a wall 24 of each channel member flat against the interior surface of an outboard panel 14 of the container wall. The width of flange 28 is such that the walls 26 and the inboard panels 16 of the corrugated container wall are essentially coplanar and so form a platform to which the sheet steel panel 20 is fixed. The sheet steel panel 20 is welded to the walls 26 of the channel members 22 after the channel members have been welded to the outside panels and is also welded to the interior surfaces of the inboard panels 16. Walls 24 of the channel members 22 extend further from the respective flanges 28 than walls 26. The disparity in height of the two channel member walls 24, 26 facilitates bending in the course of a cold forming process for manufacturing the channel members 22. Having the high wall 24 positioned against the outboard panel 14 strengthens the outboard panel and also makes it easier to weld because the presence of the smaller wall 26 does not materially inhibit access when the wall 24 is being welded to the outboard panel 14.

Each channel form stiffener is welded in a position laterally at the center of the associated outboard panel 14 by means of a fillet weld at its top (and optionally at its bottom), and a series of button (or plug) welds through spaced 5/16" diameter circular apertures in walls 24 of the channel members. The sheet steel panel is welded to the channel members 22, by a series of button welds made at quarter inch diameter circular apertures 30 in the panel 20, the button welds spaced from the floor by distances of 12, 30, 54, 78 and 102 inches, the smaller spacing at the bottom being to combat higher stresses at the bottom of the container when it is full. Button welds are an important structural element of the intermodal container conversion because they provide a controllable technique offering good penetration to the corrugated container wall while providing a reduced risk of burn damage compared with other welding techniques. The preferred welding process is MIG welding in spray mode with a 0.035 mm metal core wire, a Praxair® MIG Mix Gold™ Gas (argon/$CO_2$ mix), a 350 wire feed speed, and 24V setting. These conditions consistently provide a full penetration weld without burning through the outside wall. Clearly, different welding techniques and materials can be utilized to achieve wall reinforcement using the panels 20 and channel members 22 as described. It is desirable however, to use a process and materials to obtain a strong welding pattern quickly and without burning through the outer wall of the intermodal container.

For supply convenience, the sheet steel panel 20 is formed from two panels each of the order of 4-5 feet in width laid on edge so that together they span the eight feet plus interior height of the intermodal cube container. Spacing between edges of adjacent areas of steel panel, whether horizontal or vertical, is made as small as possible and certainly less than 2 inches. This is important because when the intermodal container is used as a liquid container, an insulating polystyrene layer 32 is often fixed by adhesive to the inner face of the reinforcing sheet steel panels and then a liquid tight liner 34 is arranged over and secured by adhesive foam caulking to the insulating layer 32. The pressure of liquid in a full tank or container is so high that if the gap between adjacent sections steel panel 20 is too large, the pressure of the contained liquid would deform and press the liner 34 and insulating layer 32 into the gap and possibly damage one or both of the liner and insulation. If no insulation layer is required, it is still important that the panels are fitted closely together to minimize the chance of liner damage. In this case, the liner is attached directly to the steel wall with seams being taped to protect the liner from any sharp edges. In this case, the panel to panel space is preferably less than a quarter inch.

It should be noted that important associated procedures may need to be implemented as part of the reinforcing method. If the internal walls of the unreinforced container are painted, then before any welding of reinforcing structures is performed, the interior of the container is sandblasted to render steel bare in order to prepare it for welding. After welding is completed, the inwardly facing reinforced walls are epoxy painted to prepare them to receive the flexible liner and optionally, the insulation layer.

An alternative embodiment of the invention is illustrated in FIG. 5. In this embodiment, the container walls are reinforced by a series of angle bars 36, 38 of eighth inch thick carbon steel which are welded to the inside of the corrugated container wall, the angle bars and the welding arrangement operating similarly to strengthen the container walls to which they are welded. Angle bar 38 has a wall 40 and a flange 42 extending perpendicularly from the wall. Angle bar 36 has a first wall 44, a perpendicularly extending flange 46, and a second wall 48. This latter structure is therefore of channel form with the additional wall 48 adding further stiffening to the structure.

A welding sequence for the reinforcing method is performed in a stepwise fashion with an angle bar 38 first being welded to the container wall, then an angle bar 36 being welded to the container wall and to the prior-welded angle bar 38, etc. MIG (metal inert gas) welding is used in a wire feed process although other welding methods may alternatively be used. In a preferred example, stitch welding is used with 3 inch long welds and with the welds being located on 12 inch centres.

As shown in FIG. 5, welding of the angle bars 36, 38 takes place from right to left but it will be understood that the sequence of welding could be performed from left to right. The particular sequence is best described with reference to the length of wall shown which has two inboard panels 16 and an intervening outboard panel 14. Welding of an initial angle bar at one lateral end of the container wall and welding of a final angle bar at the other end of the container wall are performed in a slightly different way.

In the particular sequence, a first angle bar 38 is positioned as shown with wall 40 against the inner surface of inboard panel 16 and flange 42 located against the inner surface of the outboard panel 14. The angle bar 38 is welded to the outboard panel 16 at location 49 and to a previously welded angle bar 38 at location 51. The dimensions of the angle bar 38 are such that the edge of the distal end of the wall 40 is presumed to have been welded "upstream". A channel bar 36 is then positioned as shown with the wall 44 against the inner surface of the outboard panel 14 and the flange 46 flat against the flange 42. The channel bar 36 is welded to the flange 42 of the angle bar 38 at location 50 and is welded to the outboard panel at location 52.

FIG. 6 shows yet another reinforcing structure for a standard intermodal container. In this embodiment, a single sheet 54 of one eighth inch carbon steel is cold formed to a corrugated form having outboard panels 56 and inboard panels 58 and with flanges 60 extending perpendicularly to the general plane of the corrugated structure, the flanges 60 integrally connecting each outboard panel 56 to its adjacent inboard panel 58. The corrugated strengthening panel is welded to the outboard and inboard panels respectively 14 and 16 at aperture welds 62. It will be seen with this structure that the insulating layer and liner are unsupported where they are located over each of the outboard panels 56. Consequently, the lateral extent of the panels 56 should be made sufficiently small that the integrity of the insulation and liner are not jeopardized when the container is full and the weight of wastewater tends to press them outwardly towards the panels 56.

Figure 7:
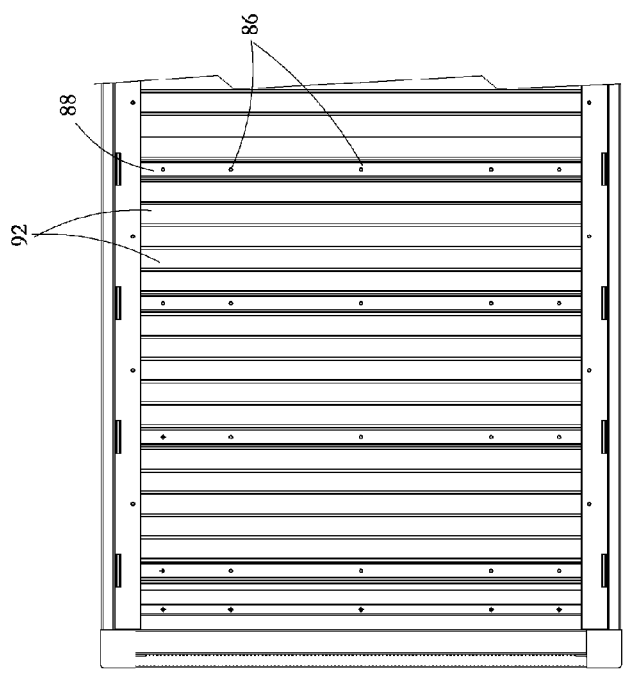
FIG. 7 is a view from below of the roof of a converted intermodal container showing locations of suspension assemblies according to an embodiment of the invention.
Figure 8:
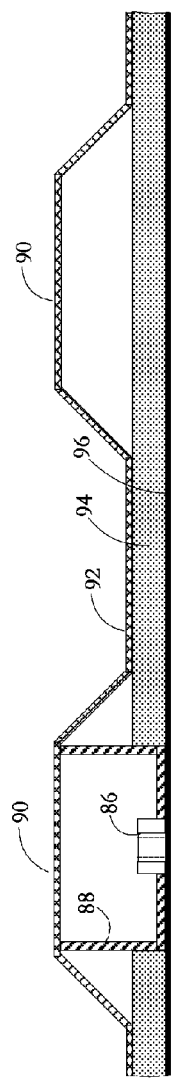
FIG. 8 is a detail vertical sectional view showing a part of a converted intermodal container roof and an upper part of a suspension assembly according to an embodiment of the invention.

The top wall or roof of the container is also reinforced but in a manner somewhat different from the side walls and in a manner adapted for supporting processing equipment or utilities such as power or communication cabling. Referring in detail to FIGS. 7 and 8, there is shown the roof 12 of a converted intermodal container, the roof formed with a stamped pattern of corrugations 84. Nuts 86 are welded into apertures formed in reinforcing channel bars 88 and the bars are then welded at locations to outboard panels 90 of a number of the corrugations. The reinforcing bars 88 and the nuts 86 are dimensioned and fitted so that they project one inch downwardly beyond the plane occupied by the inner surfaces of inboard corrugation panels 92 of the container roof 12. By fitting the reinforcements at the outboard panels 90, strong joists are provided without significantly affecting the inside intermodal container shipping height. One inch thick insulation 94 is then applied to the roof 12 except at the positions of the reinforcing bars 88 to bring the roof to a common level for subsequent application of a liner cap part 96. The reinforcing bars 88 act as strengthening joists at the roof with the threaded bores of the suspension nuts 86 providing anchor points for receiving threaded suspension bolts forming part of equipment support assemblies (not shown).

While other forms of reinforcing element can be welded to the top wall of the intermodal container, the channel bar illustrated is preferred as it extends across the full length of the container top wall enabling the positioning of a suspension assembly at any position across the width of the tank. Also, a bar can be placed in any selected "up" corrugation enabling the positioning of a suspension assembly at substantially any desired position along the length of the converted intermodal container tank. The internal height dimension of the reinforced container is not substantially less than the height of the unreinforced container compliant with the ISO 6346 standard.

Reinforcing the container in a manner such that internal width, length and height of the container is reduced only to a minor extent is valuable. Thus, the reinforcing conversion may be undertaken in one location, with provisioning of the reinforced container to adapt it for water treatment being undertaken at another location. Transfer of the empty reinforced container from the first to the second location represents a revenue opportunity as the reinforced container can be used to carry cargo between the locations. However, the revenue opportunity can only be realized if the interior volume of the container is not materially reduced, otherwise special arrangements have to be made recognizing that a non-standard cargo volume is to be shipped.

The nut 86 and suspension bolt combinations can be configured to provide any of several functions. Firstly, they can be part of suspension assemblies used for supporting heavy processing equipment at selected locations and depths in the tank. Secondly, they can be part of suspension assemblies including brackets tailored for supporting relatively lightweight components such as communication and power cabling, piping, etc., within a top region of the intermodal container. Finally, some of the nut and bolt combinations can provide a securing mechanism for use in making a seal between parts of an interior flexible liner.

As an alternative to the nuts 86, the reinforcing bar can be formed with a horizontal section with areas of relatively increased thickness, the thicker sections being bored and internally threaded to provide direct anchor points in the reinforcing bar 88 for installation of suspension assemblies. Other forms of roof fixtures for the suspension assemblies are possible. In one alternative, a spring biased clamping mechanism (not shown) can be used having an upper fixture member with spring-actuated clamping elements mounted to the reinforcing bars above an entrance aperture in the bars. The lower fixture member is a cylindrical stud having a lower threaded part and an upper wider part shaped to cooperate with the spring clamping members. At installation, the lower fixture member is pushed up through the entrance aperture to force the clamping elements apart until the stud reaches a locking position at which the clamping elements are forced back towards each other by the spring action to clamp the stud in position. The wider part of the stud can for example be the shape of a ball with the clamping elements presenting a claw-shaped holder.

It will be seen that each of the example methods and structures for reinforcing an intermodal container wall add strengthening material only to the inside of the container, with the outside dimensions of the container remaining unchanged after the reinforcing is complete. This means that, after reinforcing, the container continues to meet the outside dimensional requirements of the ISO 6346 standard for that length of container.

In each of the embodiments of FIGS. 3 to 8, the internal width of the container wall is reduced by only a small amount. The illustrated strengthening structures have flanges extending at substantially 90 degrees to the general plane of the intermodal container wall, the flanges joining outboard container panels to inboard flat members which are joined to the inboard container panels. Compared to the unreinforced walls, this container wall structure is considerably less prone to bending when the container is filled fully with water. It will be appreciated that the reinforcing structure can be altered somewhat without compromising the reinforcing properties and while using the principles inherent in the illustrated designs.

Figure 9:
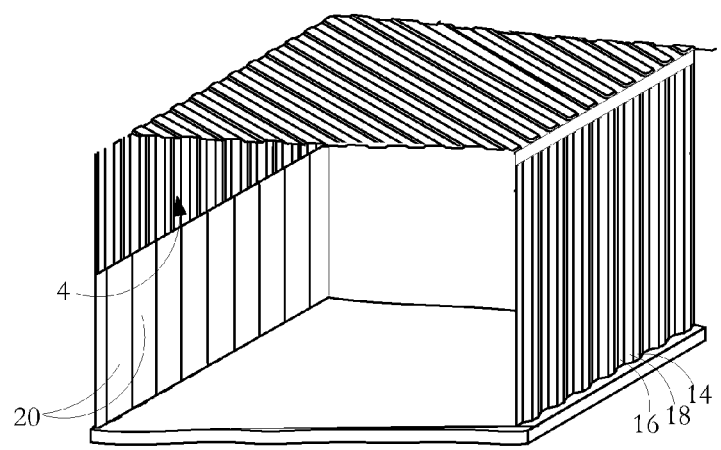
FIG. 9 is a cutaway view showing part of the interior of a converted intermodal container according to an embodiment of the invention.

Thus, for example, the flange walls need not be absolutely perpendicularly to the general plane of the container wall. They can instead be slightly angled provided that the end effect is to provide the required reinforcing. Particularly for fluid containment, satisfactory reinforcement is achieved with a strengthening structure of the form shown that does not extend right from the bottom to the top of the intermodal container but which, instead, extends only part way up the height of the container as illustrated in FIG. 9.

As shown in the FIG. 5 embodiment, there is one channel bar 36 and one angle bar 38 for each sequence of 4 adjacent container wall panels. In an alternative arrangement, two or more channel bars 36 welded to each outboard panel 14. In another alternative, channel bars 36 are not installed at every outboard panel 14; for example, they are installed at every other outboard panel. In yet another alternative, the angle bars 38 are made with a wider wall 40, the wider wall being welded to every second or third container wall corrugation.

Other variations and modifications will be apparent to those skilled in the art. The embodiments of the invention described and illustrated are not intended to be limiting. The principles of the invention contemplate many alternatives having advantages and properties evident in the exemplary embodiments.

What is claimed is:

1. A method of reinforcing an intermodal container corrugated steel wall, the wall having an outer side and an inner side, the corrugations in a container length direction having alternating inboard and outboard flat panels extending parallel to the general plane of the wall and with adjacent panels joined by web portions, the method using channel form members each having a first plate and second plate and a web member extending substantially perpendicularly between the first and second plates, said first plate extending further from the web member than the second plate, the method comprising welding the first plates of a plurality of the channel form members flat against the interiors of a respective plurality of the outboard panels, welding a sheet steel panel flat against both a plurality of the inboard panels located adjacent respective ones of the plurality of outboard panels and flat against the second plates of the plurality of the channel form members, the sheet steel panel having welding apertures at which welds are made between the sheet steel panel and the second plates.

2. A method as claimed in claim 1, the container having opposed end walls and opposed side walls, the plurality of channel form members and the sheet steel panel forming a reinforcing structure, the reinforcing structure repeated along the length of the container side walls and along the width of the container end walls.

3. A method as claimed in claim 2, the reinforcing structure extending over only a lower part of the height of the container wall.

4. A method as claimed in claim 1, the web portions being flat panels sloped in the length direction relative to the general plane of the wall, each web panel extending between an outboard panel and a next adjacent inboard panel.

5. A method as claimed in claim 1, the method of reinforcing a wall applied to each container end wall and each container sidewall, the method of reinforcing resulting in a decrease in interior width of the container of less than one half of an inch and a decrease in interior length of the container of less than one half of an inch.

6. A reinforced intermodal container having a corrugated steel wall, the wall having an outer side and an inner side, the corrugations in a container length direction having alternating inboard and outboard flat panels extending parallel to the general plane of the wall and with adjacent panels joined by web portions, a plurality of channel form members each having a first plate and second plate and a web member extending substantially perpendicularly between the first and second plates, said first plate extending further from the web member than the second plate, the first plates of a plurality of the channel form members welded flat against the interiors of a respective plurality of the outboard panels, and a sheet steel panel welded both flat against a plurality of the inboard panels located adjacent respective ones of the plurality of outboard panels and flat against the second plates of the plurality of channel form members, the sheet steel panel having welding apertures at which welds are made between the sheet steel panel and the second plates.

7. A reinforced intermodal container as claimed in claim 6, the container having opposed end walls and opposed side walls, the plurality of channel form members and the sheet steel panel forming a reinforcing structure, the reinforcing structure being repeated along the length of the container side walls and along the width of the end walls.

8. A reinforced intermodal container as claimed in claim 7, the reinforcing structure extending over only a lower part of the height of the container wall.

9. A reinforced intermodal container as claimed in claim 6, the web portions being flat panels sloped in the length direction relative to the general plane of the wall, each web panel extending between an outboard panel and a next adjacent inboard panel.

10. A reinforced intermodal container having each end wall and each side wall reinforced as claimed in claim 7, the interior spacing of the reinforcing structures at opposed side walls being no more than one half inch less than the interior spacing of the inboard flat panels of the opposed side walls, the interior spacing of the reinforcing structure at opposed end walls being no more than one half inch less than the interior spacing of the inboard flat panels of the opposed end walls.

* * * * *